(12) United States Patent
Tanaka et al.

(10) Patent No.: US 6,832,292 B2
(45) Date of Patent: Dec. 14, 2004

(54) MULTIPLE ACCESS STORAGE SYSTEM

(75) Inventors: Atsushi Tanaka, Saitama (JP); Tetsuya Uemura, Sayama (JP)

(73) Assignee: Hitachi, Ltd., Tokyo (JP)

( * ) Notice: Subject to any disclaimer, the term of this patent is extended or adjusted under 35 U.S.C. 154(b) by 28 days.

(21) Appl. No.: 10/335,854

(22) Filed: Jan. 3, 2003

(65) Prior Publication Data

US 2003/0225968 A1 Dec. 4, 2003

(30) Foreign Application Priority Data

Jun. 4, 2002 (JP) ........................................ 2002-162362

(51) Int. Cl.[7] .............................................. G06F 12/00
(52) U.S. Cl. ..................................................... 711/114
(58) Field of Search .......................... 711/111, 112, 114

(56) References Cited

U.S. PATENT DOCUMENTS

| | | | |
|---|---|---|---|
| 5,463,758 A | | 10/1995 | Ottesen |
| 5,627,990 A | * | 5/1997 | Cord et al. .................. 711/122 |
| 6,076,143 A | * | 6/2000 | Blumenau .................... 711/114 |

OTHER PUBLICATIONS

U.S. Appl. No. 10/219,770, Fujiwara et al., filed Aug. 16, 2002.
U.S. Appl. No. 10/234,235, Uemura et al., filed Sep. 5, 2002.
Daisuke Ito and Haruo Yokota, Abstract of Performance Assessment Study of an Online Reconfiguration of an Autonomous–Disk Cluster:, The Institute of Electronics, Information and Communication Engineers (IEICE), Technical Report, vol. 101, No. 339, pp. 17–24.

* cited by examiner

*Primary Examiner*—Matthew D. Anderson
(74) *Attorney, Agent, or Firm*—Reed Smith LLP; Stanley P. Fisher, Esq.; Juan Carlos A. Marquez, Esq.

(57) ABSTRACT

In the multiple access storage system, when there is a data access request designated by a data frame transmitted from a host computer to a storage blade SB#0 through a network for data, the data frame is transferred to SB#2 having possibility of presence of data corresponding to the data access request if the data is not found in SB#0. If the data is not found in SB#2 either and the number of transmission times of the data frame between SBs as counted in the data frame is not smaller than the threshold of the number of transmission times set as an equal value in each SB, SB#2 broadcasts the data frame to all SBs having possibility of presence of the data. If the number of transmission times is smaller than the threshold, SB#2 transfers the data frame to another SB having possibility of presence of the data.

12 Claims, 10 Drawing Sheets

MULTIPLE ACCESS STORAGE SYSTEM

CROSS-REFERENCE TO RELATED APPLICATION

The present invention relates to U.S. patent applications Ser. No. 10/219,770 filed by S. Fujiwara et. al. on Aug. 16, 2002 and Ser. No. 10/234,235 filed by T. Uemura et. al. on Sep. 5, 2002.

BACKGROUND OF THE INVENTION

1. Field of the Invention

The present invention relates to a server and storage system technique and particularly to a storage system having a plurality of storage blades as constituent members and needing high response characteristic, large number of transactions and high reliability.

2. Description of the Related Art

The capacity of a hard disk (HDD) has increased year by year. When HDDs are combined to form a disk system, damage due to failure in one HDD becomes very large. Therefore, a system for achieving high availability with low cost while protecting respective user data from single HDD failure or the like has been demanded. "Performance Assessment Study of an Online Reconfiguration of an Autonomous-Disk Cluster", The Institute of Electronics, Information and Communication Engineers (IEICE), Technical Report of IEICE, Vol. 101, No. 339 and U.S. Pat. No. 5,463,758 disclose a data storage system of greater capacity.

SUMMARY OF THE INVENTION

A chief object of the present invention is to provide a technique for reducing the number of times for retrieving primary and secondary data to suppress lowering of performance in the case where data mirroring is performed in a disk system constituted by a plurality of storage blades.

Another object of the present invention is to provide a technique for improving reliability of a disk system by terminating data write in an early stage of processing in the case where double write of data is performed in the disk system constituted by a plurality of storage blades.

To achieve the foregoing objects, the present invention provides a multiple access storage system having: a plurality of storage blades; and interconnection means for connecting the plurality of storage blades to one another and connecting each of the storage blades to a host system; wherein: each of the storage blades includes a HDD for storing user data or redundant data of the user data, a controller for controlling the HDD, and an I/O port for input/output of a data frame from/to the interconnection means; the controller judges, upon reception of a data access request designated by a data frame given from the I/O port, whether data corresponding to the data access request is stored in the HDD or not, and transfers the data frame to another storage blade having a high possibility of presence of the data corresponding to the data access request when the data is absent in the storage blade; a transmission times region for counting the number of transmission times by which the data frame is transferred between storage blades is provided in the data frame so that a threshold of the number of transmission times is set in each of the storage blades; and if the number of transmission times stored in the transmission times region is not smaller than the threshold of the number of transmission times when a decision is made that the access-requested data is not stored in the HDD, the controller broadcasts the data frame to all storage blades having possibility of presence of the data.

DESCRIPTION OF THE EMBODIMENTS

Figure 1:
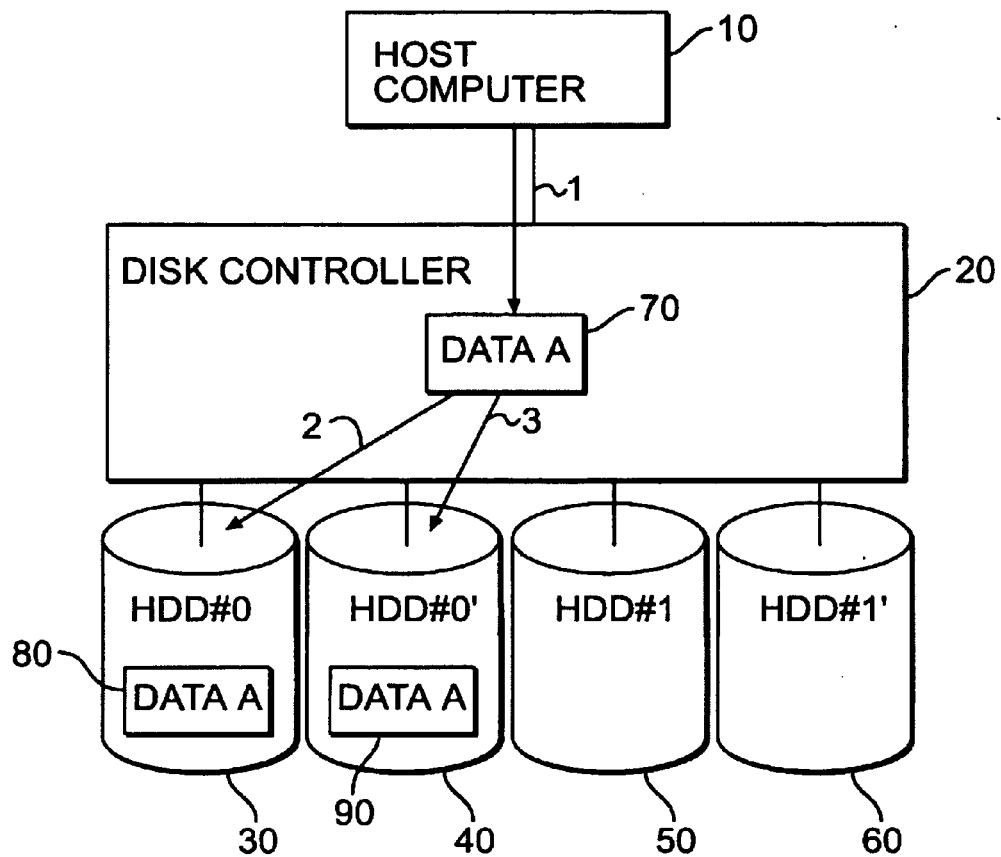
FIG. 1 is a diagram showing the configuration of a multiple storage system.

Before explaining the embodiments, there are discussed some intermediate systems obtained by the inventors on the process to the present invention. In a computer and disk system, a large-size disk controller 20 as shown in FIG. 1 centrally controls HDDs 30, 40, 50 and 60.

A write data (data A) 70 sent from a host computer 10 is doubly written in two HDDs 30 and 40. Even in the case where one HDD breaks down, the other HDD can be accessed to thereby retain high reliability.

When the large-size disk controller 20 is used for centralized control as described above, the disk controller needs to have a very high function. Hence, the cost of the system as a whole becomes high.

In addition, because control is performed by a single controller, there is possibility that the disk controller becomes a bottle neck to performance.

On the other hand, a system using a plurality of CPUs for distributed control of the entire disk system has been discussed recently.

Figure 2:
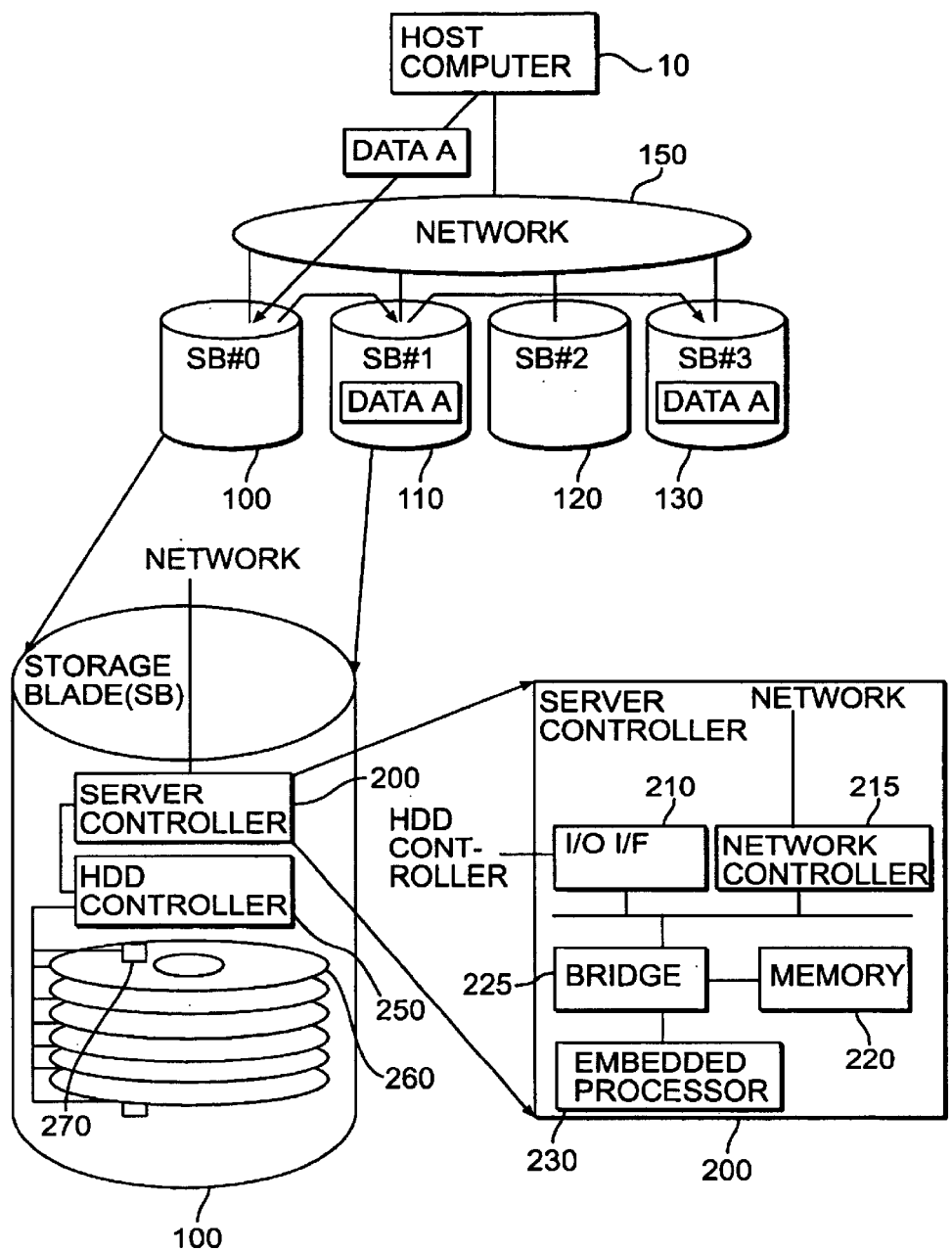
FIG. 2 is a diagram showing the configuration of a storage blade.

FIG. 2 shows, as an example of the system, a system using storage blades (SBs) each having a CPU, a memory and a network controller.

In FIG. 2, the disk controller 20 and the HDDs 30, 40, 50 and 60 shown in FIG. 1 are not provided but SBs 100, 110, 120 and 130 are directly connected to a network 150, in place of the disk controller 20, and the HDDs 30, 40, 50 and 60.

The SB 100 has a server controller 200 and a HDD controller 250 in its inside. The server controller 200 and the HDD controller 250 perform a network/server process and an HDD process respectively. The server controller 200 has an I/O port for signal input/output between the SB 100 and the network 150.

The same hardware as that of a general server is provided in the inside of the server controller 200. An embedded processor 230 and a memory 220 are connected to each other by a bridge 225.

An I/O interface 210 for commination with the HDD and a network controller 215 for communication with the network 150 are connected to the bridge 225 through a bus.

The HDD controller 250 is constituted by hardware for controlling a general magnetic disk. The HDD controller 250 performs control of magnetic media 260 and magnetic heads 270 and read/write control of data.

When a plurality of SBs are arranged for distributed control, the disk system shown in FIG. 1 can be replaced.

When the host computer 10 is to access the disk system, the host computer 10 sends a command/data to suitable one of the SBs. Incidentally, the "command/data" sent to the SB is hereinafter also referred to as "I/O".

If data is found in the received SB, the SB replies directly. If data is not found in the received SB, information in the SB is used for transferring the command/data to another SB having possibility of presence of the data.

In the case shown in FIG. 2, because the host computer 10 sends command/data to SB#0 but data is not found in SB#0 (100), retrieval is made on SB#1 (110) and SB#3 (130).

In the case of the disk system shown in FIG. 2, because distributed control is performed, high performance and large capacity are not required of each CPU and each memory respectively. Hence, the cost of the disk system as a whole can be reduced. In addition, because control is distributed, the bottle neck of performance can be lightened.

Figure 3:
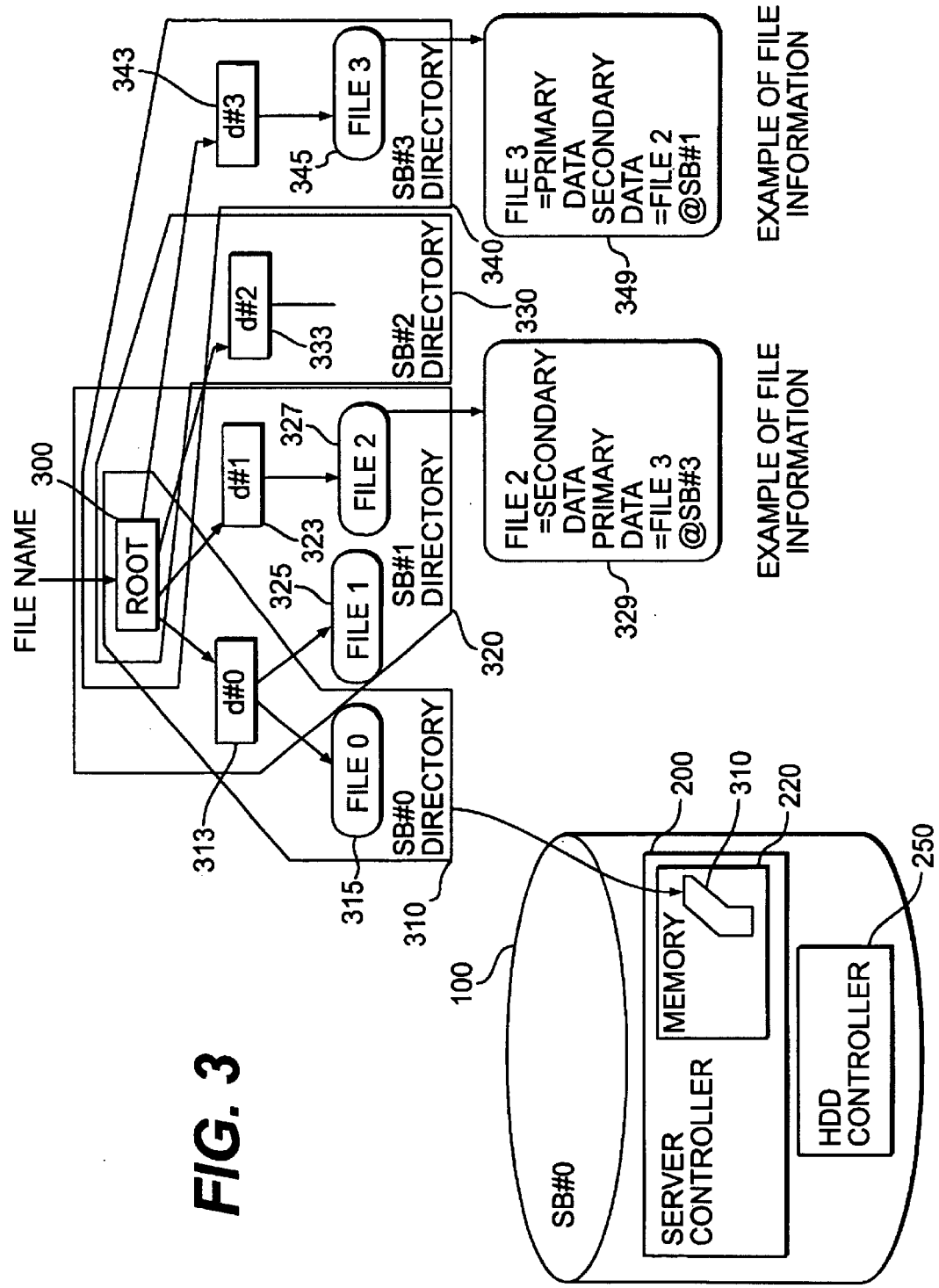
FIG. 3 is a diagram showing an example of directory structure in storage blades.

FIG. 3 shows an example of directory structure in the storage blades.

A whole directory structure of the disk system is formed as a binary tree structure ranging from root (300) to an example of file information 349.

In consideration of updating of directories, however, it cannot be said that storage of the same information in all SBs is regarded as optimum.

It is therefore conceived that a distributed directory in which parts of the directory are allocated to SBs for storage is optimum.

In FIG. 3, for example, an SB#0 directory 310 containing a root (300), a node d#0 (313) and a file 0 (315) having stored file information is stored in the memory 220 in the server controller 200 of SB#0 (100).

An SB#1 directory 320, an SB#2 directory 330 and an SB#3 directory 340 are stored in SB#1 (110), SB#2 (120) and SB#3 (130) respectively.

When mirrored data control is performed in the directory structure, data are written in file information.

When, for example, primary and secondary data are present in a file 3 (345) and a file 2 (327) respectively, data indicating the fact that the file 3 has primary data while the file 2 of SB#1 (110) has secondary data is written in file information 349 of the file 3, and data indicating the fact that the file 2 has secondary data while the file 3 of SB#3 (130) has primary data is written in file information 329 of the file 2.

Distributed control of read/write of mirrored data can be performed on the basis of search of these data (file information).

As described above, use of the storage blades (SBs) and the distributed directory permits distributed control of the disk system.

When the directory is distributed, there is however possibility that the SBs may be accessed by a number of times to search for a target SB.

Particularly when a large number of SBs are used, this tendency is intensified to cause lowering of performance. In addition, when double write is performed, the number of searches becomes larger so as to cause more lowering of performance.

Figure 4:
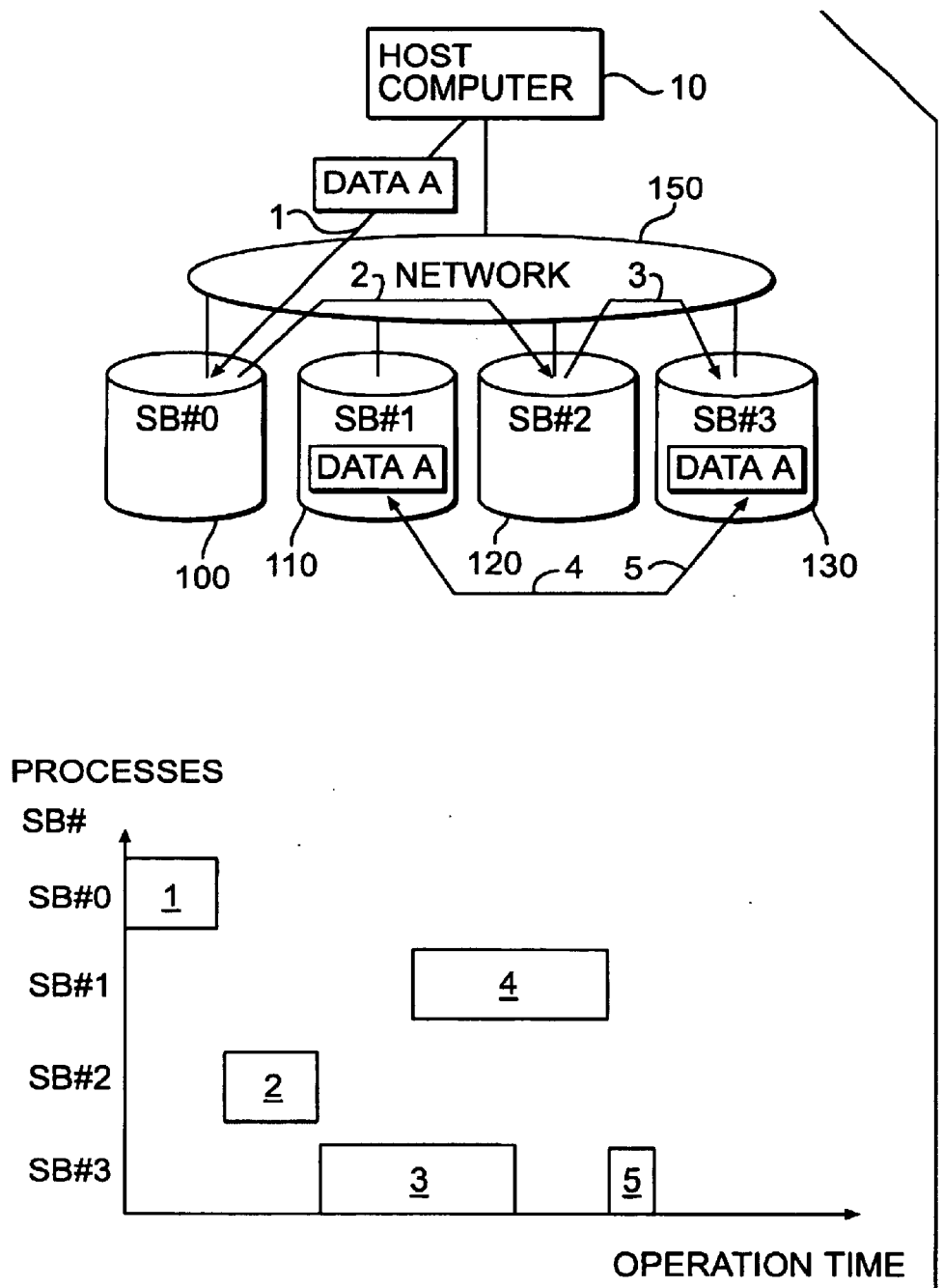
FIG. 4 is a diagram for explaining an example of double write in a storage blade type multiple storage system.

FIG. 4 shows an example of this double write.

A primary data is present in SB#3 (130) while a secondary data is present in SB#1 (110).

In this condition, the host computer 10 first accesses SB#0 (100) to access this data (①).

Because this data is however absent in SB#0 (100), another SB having possibility of presence of this data is selected by referring to the SB#0 directory 310 shown in FIG. 3.

In this example, because information for specifying the target SB cannot be obtained from the SB#0 directory 310, SB#2 is accessed for the present (②).

It is however found that this data is also absent in SB#2.

Next, SB#3 (130) is accessed (③).

On this occasion, the fact that the file 3 (345) has the primary data can be first retrieved from the SB#3 directory (340) and, at the same time, it is found that the secondary data is present in the file 2 (327) of SB#1 (④, ⑤).

Incidentally, the lower half of FIG. 4 shows the relation between processing in each SB and the time required for the processing.

As described above, the number of access times is five, so that the processing time becomes large so as to cause lowering of performance.

In addition, because actual write of data is first performed after access is made by three times, there is high possibility of data loss when a certain failure occurs in the middle of access.

Embodiment 1

Embodiment 1 of the present invention will be described below in more detail with reference to the drawings.

Figure 5:
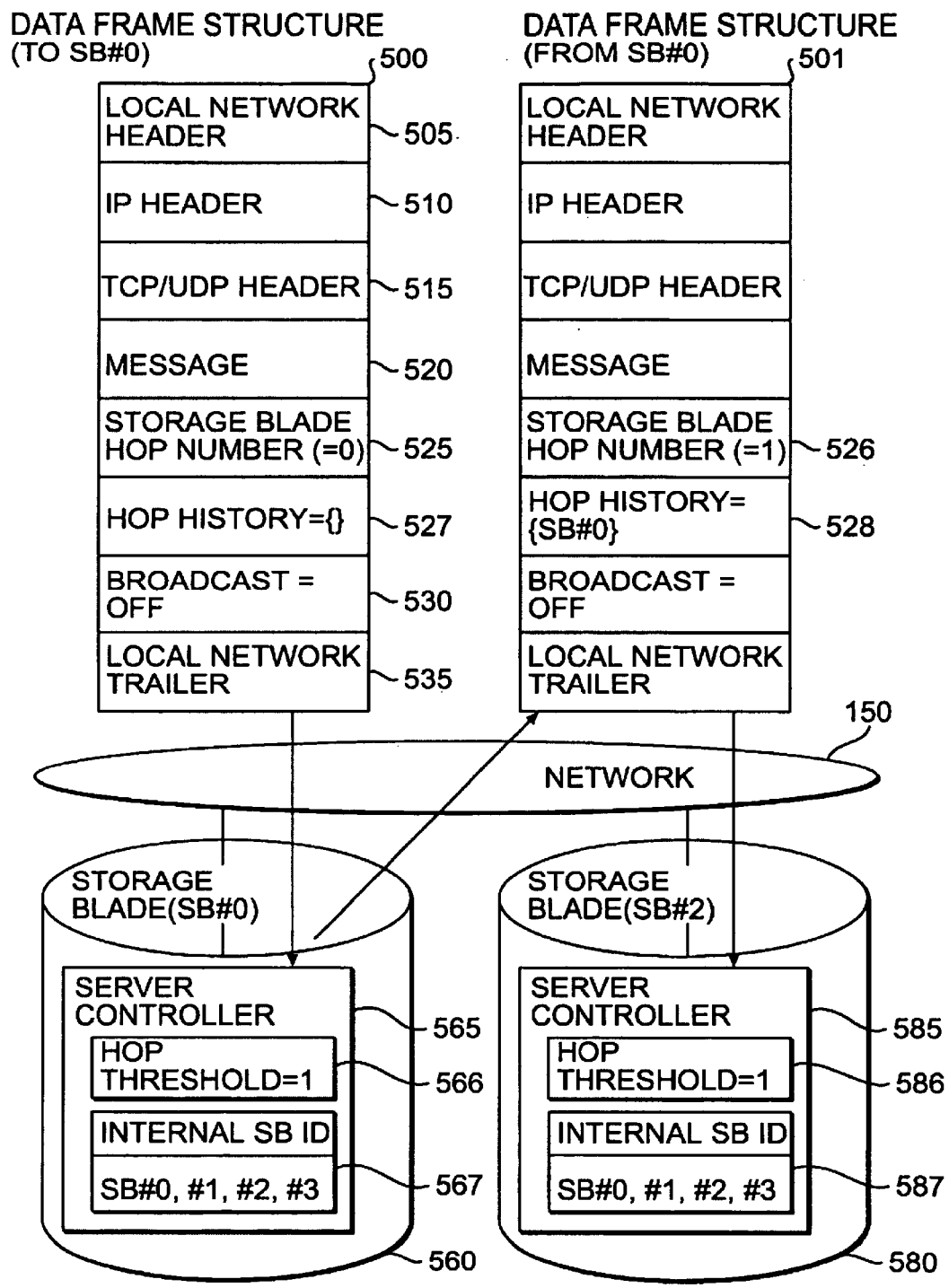
FIG. 5 is a diagram showing an example of data frame structure in Embodiment 1 of the present invention.

FIG. 5 shows an example of data frame structure in Embodiment 1 of the present invention.

Data frame structure 500 (to SB#0) refers to the IP/UDP protocol.

Control information such as address, data length, etc. necessary for LAN communication is stored in a local network header 505.

Control information such as address, data length, etc. necessary for communication using IP is stored in an IP header 510.

Control information such as address, data length, etc. necessary for communication using UDP is stored in a UDP header 515.

It is self-evident that the present invention may be applied to any other protocol than the IP/UDP protocol without departing from the scope of the present invention.

The reference numeral 520 designates a message in which a read/write command or data is stored.

The reference numeral 525 designates a storage blade hop number which is incremented by one by a server controller 565 or 585 whenever the data frame structure 500 is sent to each storage blade and retrieval is performed.

The reference numeral 527 designates a history of hops in which ID of a storage blade is recorded whenever the storage blade passes through the hop history.

When, for example, a data frame structure 500 is sent to a storage blade (SB#0) but data cannot be retrieved in the storage blade, a server controller of the storage blade (SB#0) increments the storage blade hop number 525 by one as shown in a storage blade hop number 526 of a data frame structure 501 (from SB#0) before the server controller requests the next storage blade (SB#2) to retrieve the data.

In addition, the ID of the storage blade (SB#0) passed through the hop history 527 is recorded as shown in a hop history 528.

The reference numeral 530 designates a flag for indicating broadcast. This flag is OFF at the time of ordinary retrieval. When ordinary retrieval is given up and the data frame structure 500 is to be simultaneously sent, that is, broadcast to remaining storage blades, this flag turns ON.

The reference numeral 535 designates a local network trailer in which error check code of data, terminal code of data, etc. is written.

The storage blades (SB#0) 560 and (SB#2) 580 have hop thresholds 566 and 586 respectively. Each of the hop thresholds 566 and 586 is used for deciding the upper limit of the storage blade hop number.

The reference numerals 567 and 587 designate tables respectively. IDs of storage blades in this system (intra-system SBIDs) are registered in each of the tables 567 and 587. Each of the tables is referred to when broadcast is performed.

When the data frame structure 500 is sent to SB#0 and SB#2 but there is no data in SB#0 and SB#2, the server controllers 565 and 585 compare the storage blade hop number 525 with the hop thresholds 566 and 586 set in advance in the server controllers 565 and 585 respectively. Each of the server controllers 565 and 585 stops the continuation of the retrieval when the storage blade hop number 525 is not smaller than the corresponding threshold.

Then, the data frame structure 500 is simultaneously sent to remaining storage blades which have been not written in the hop history 528, by referring to the intra-system SBIDs (587).

Incidentally, the hop thresholds 566 and 586 can be changed by the user through an external interface in accordance with the load applied on the disk system, or the like.

Figure 6:
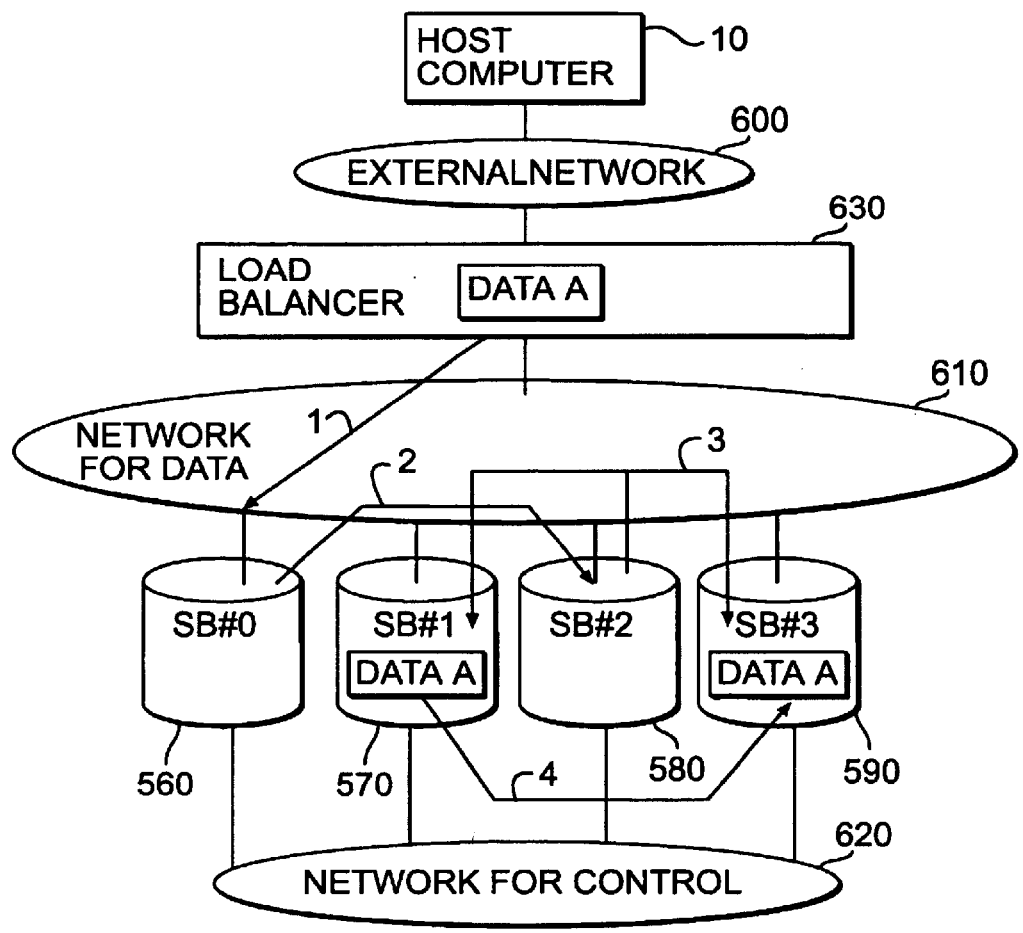
FIG. 6 is a diagram for explaining an example of double write in Embodiment 1 of the present invention.
Figure 6:
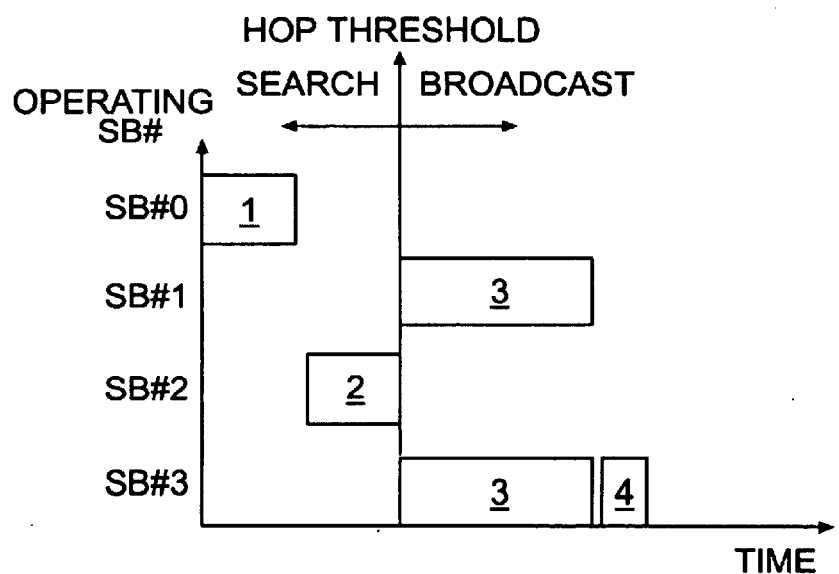

FIG. 6 shows an example of double write in Embodiment 1 of the present invention.

The host computer 10 sends a command/data to a load balancer 630 through an external network 600.

The load balancer 630 sends the command/data to a storage blade so that a uniform load is applied on each of storage blades SB#0 (560), SB#1 (570), SB#2 (580) and SB#3 (590) (①).

Then, in this example, because data is not found in SB#0 (560), the storage blade hop number 525 is incremented by one and then retrieval is continued in SB#2 (580) unless the storage blade hop number 525 reaches the threshold (②).

In the case as shown in FIG. 4, when the request data is absent in SB#2 (580), the command/data is sent to the next SB#3 (590) to search the next candidate. In the present invention, because the storage blade hop number 525, however, becomes not small than the hop threshold 586, the command/data is simultaneously sent (i.e., broadcast) to remaining storage blades SB#1 (570) and SB#3 (590) to ascertain the presence of the data (③).

The broadcast of the command/data is performed by use of either network 610 for data or network 620 for control, especially, lower loaded one of the networks 610 and 620.

Then, the broadcast command/data is executed in SB#1 (570) and SB#3 (590) simultaneously, so that the primary and secondary data for double write can be retrieved and written simultaneously.

Finally, after completion of writing of the secondary data, status of completion is sent from SB#1 (570) to SB#3 (590) through the network 620 for control, so that double write is completed (④).

Incidentally, the lower half of FIG. 6 shows the relation between processing in each SB and the time required for the processing.

As described above, in the case of double write shown in FIG. 6, because double write can be processed simultaneously, the processing time can be shortened compared with the case shown in FIG. 4.

Figure 7:
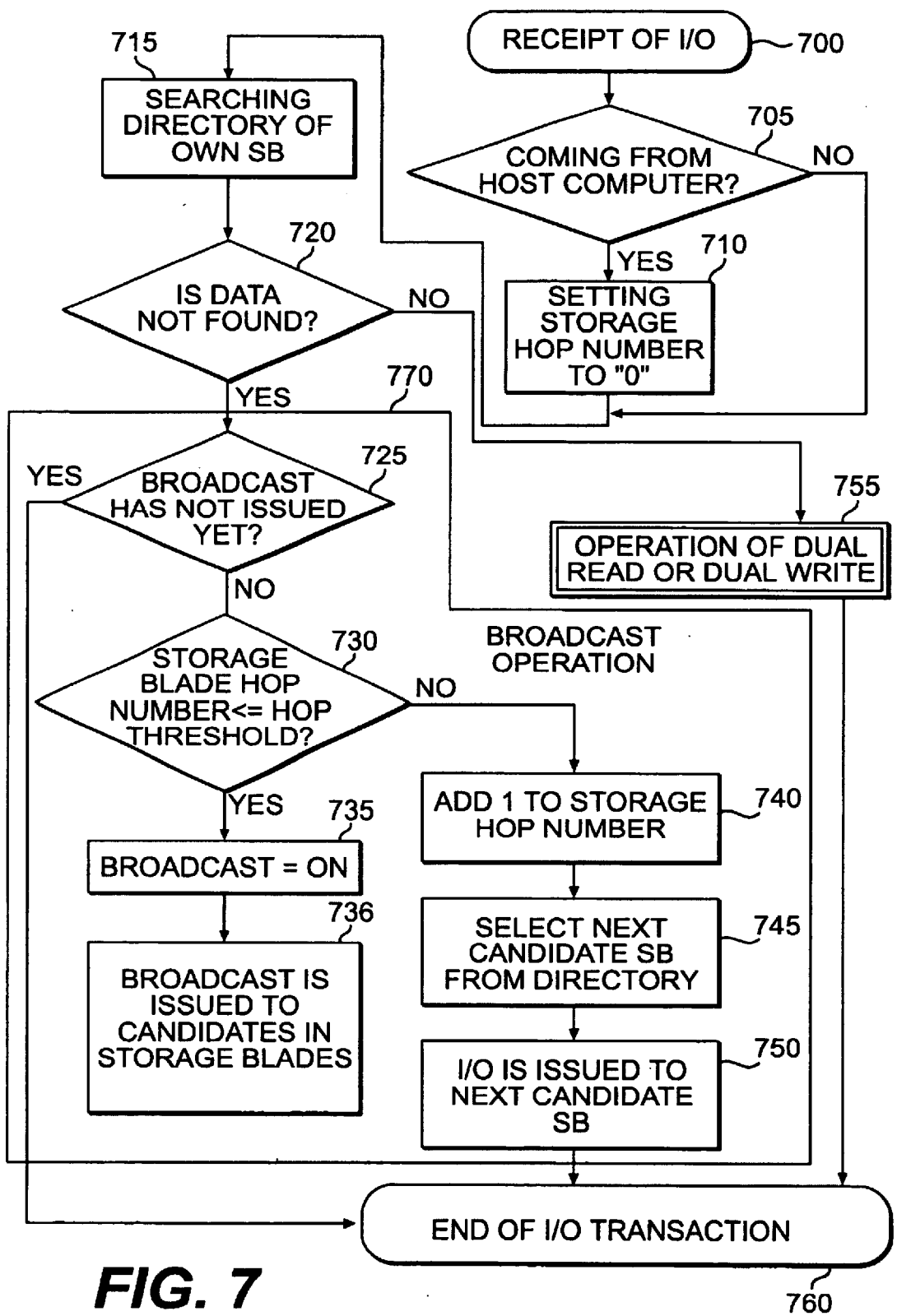
FIG. 7 is a flow chart showing an I/O transaction in Embodiment 1 of the present invention.

FIG. 7 is a flow chart showing an I/O transaction in Embodiment 1 of the present invention.

First, each storage blade receives I/O from the host computer 10 or another storage blade (700).

Then, checking is made as to whether the I/O is I/O coming from the host computer (705).

When the I/O is I/O coming from the host computer 10, the storage blade hop number is reset to zero (710).

Then, the directory of the own storage blade (SB) is searched with respect to the I/O (715).

If data is found in the HDD (720), an operation of dual read or dual write is executed (755) because the primary and secondary data can be accessed soon. This operation will be described in detail with reference to FIG. 8.

If data is not found in the HDD (720), another SB is searched by use of an ordinary operation or a broadcast operation.

This operation (725 to 750) is hereinafter referred to as broadcast operation (770).

In the broadcast operation (770), first, checking is made as to whether broadcast has already issued (725). This judgment is based on the broadcast flag in the data frame structure shown in FIG. 5. When the flag is ON, a decision is made that broadcast has already issued.

When broadcast has already issued, the I/O transaction in the SB receiving I/O is terminated (760) because there is nothing to be done thereafter.

When broadcast has not issued yet, checking is made as to whether the storage blade hop number reaches the threshold (730).

If the storage blade hop number is not smaller than the threshold, the broadcast flag is first turned ON (735) because it is necessary to stop the ordinary retrieval and execute the broadcast operation.

Then, the retrieval and execution of the command/data are broadcast to all selected candidate SBs (i.e., SBs which have been not recorded in the hop history yet) (736). Then, the I/O transaction in the SB receiving I/O is terminated (760).

If the storage blade hop number is smaller than the threshold, the storage blade hop number is first incremented by one (740) because it is necessary to continue the ordinary retrieval.

Then, the next retrieval candidate SB is selected from the directory information (745).

Finally, the retrieval and execution of the command/data are sent to the candidate SB (750). Then, the I/O transaction in the SB receiving I/O is terminated (760).

Figure 8:
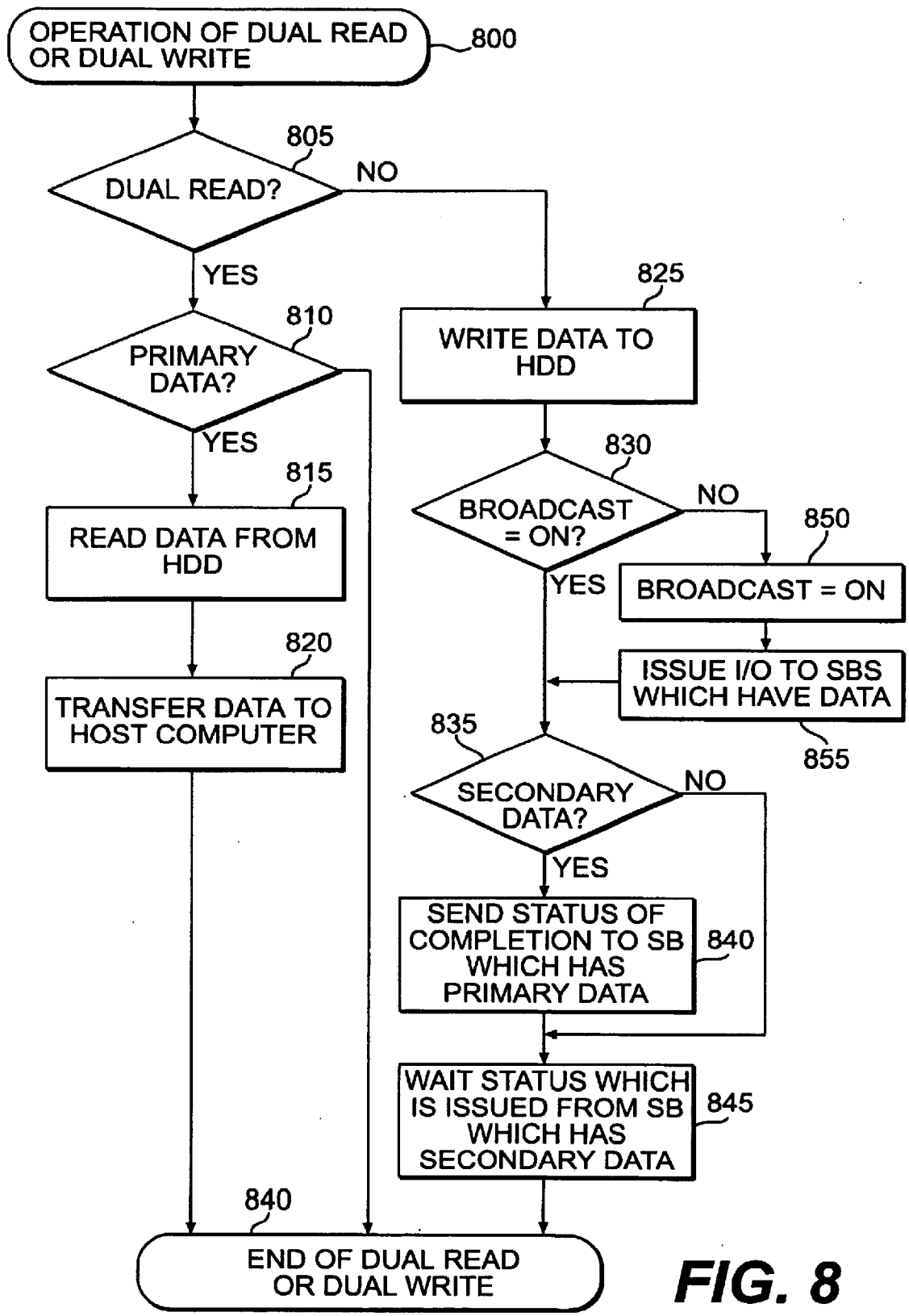
FIG. 8 is a flow chart showing double read or double write in Embodiment 1 of the present invention.

FIG. 8 is a flow chart showing double read or double write in Embodiment 1 of the present invention.

First, execution of an operation of dual read or dual write starts (800).

Then, a judgment is made as to whether the operation is dual read or dual write (805).

If the operation is dual read, a judgment is made as to whether the data in the HDD is primary data or not (810).

If the data is secondary data, the operation of dual read or dual write is terminated (860) without data read because the secondary data is only used at the time of occurrence of failure.

If the data is primary data, the data is read from the HDD (815) and transferred to the host computer (820).

Then, the operation of dual read or dual write is terminated (860).

If the operation is dual write, the data is written to the HDD (825).

Then, a judgment is made as to whether broadcast is ON (830).

If broadcast is OFF, the broadcast flag is turned ON to execute dual write (850) and then I/O is issued to SBs having primary or secondary data (855).

If broadcast is ON, a judgment is made as to whether the data is primary data or secondary data (835) because either primary data or secondary data has been already written to another SB.

If the data is secondary data, the status of completion is sent to the SB having primary data (840). The status of completion is also sent through the network 620 for control. Then, waiting is made for an answer from the SB having secondary data (845). Because the SB having secondary data is the own SB, consequently the operation of dual read or dual write is terminated (860) without waiting.

If the data is primary data, waiting is made for an answer from the SB having secondary data (845). After the arrival of the answer, the operation of dual read or dual write is terminated (860).

As described above, because increase in the number of times for retrieving data is limited by a threshold, the operating time of dual read or dual write can be shortened.

Embodiment 2

Embodiment 2 of the present invention will be described below in more detail with reference to the drawings.

Figure 9:
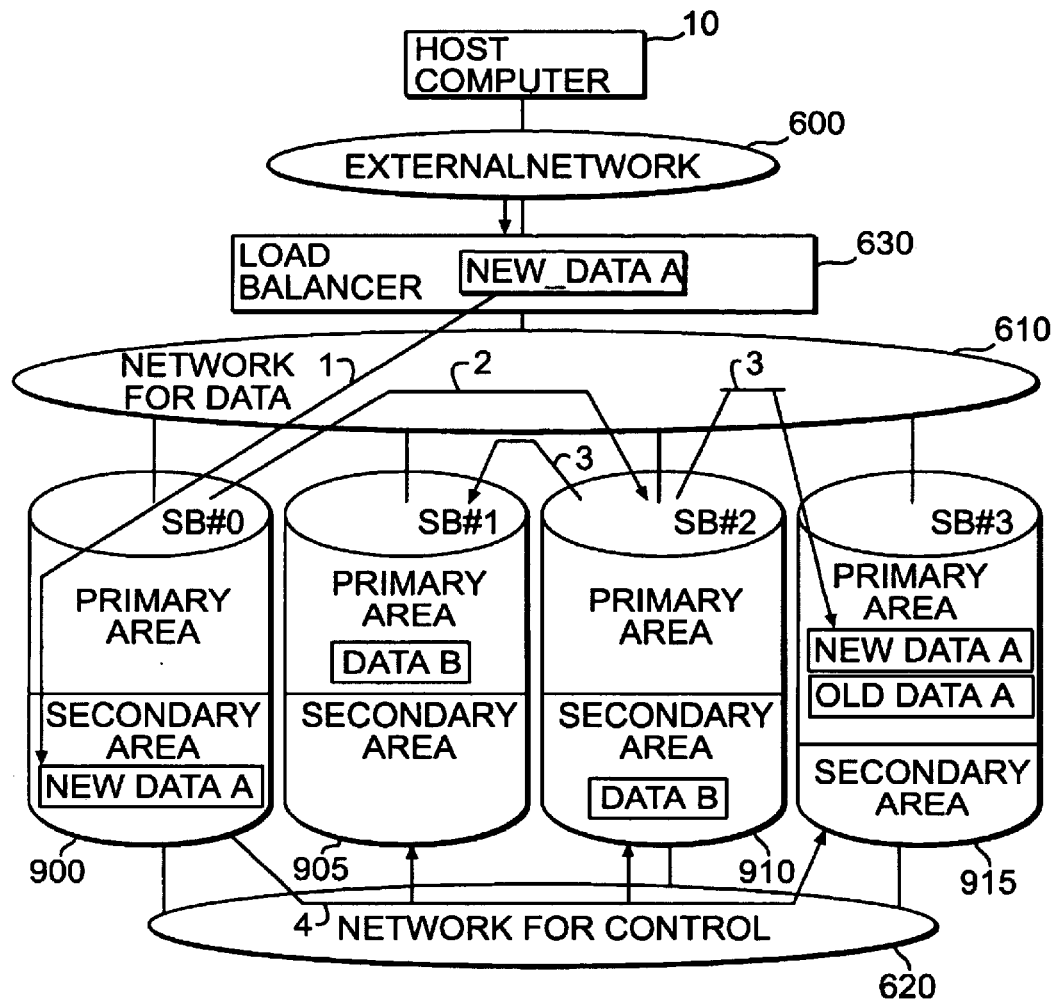
FIG. 9 is a diagram for explaining an example of double write in Embodiment 2 of the present invention.
Figure 9:
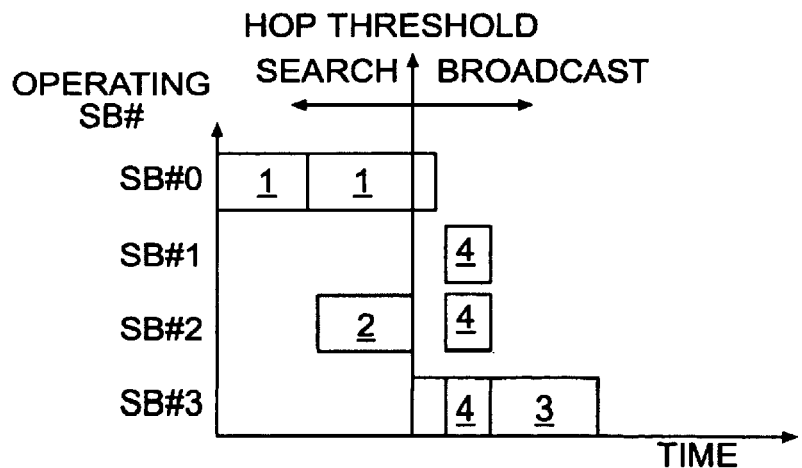

FIG. 9 shows an example of double write in Embodiment 2 of the present invention.

A primary area and a secondary area are provided in each of storage blades SB#0 (900), SB#1 (905), SB#2 (910) and SB#3 (915).

Data accessed at the time of read is present in the primary area. The SB number and address of the data are fixed.

A copy of primary data is present in the secondary area. The data is always a copy of primary data in another SB. The SB number and address of the data are not fixed. The data is additionally written in an empty area.

When the empty area is reduced, unnecessary data in the area is deleted to keep the empty area large.

The secondary area is managed by the directory in the same manner as the primary area.

The host computer 10 sends a write command/data to the load balancer 630 through the external or outside network 600.

The load balancer 630 sends the write command/data to an SB so that a uniform load can be applied on each of the storage blades SB#0 (900), SB#1 (905), SB#2 (910) and SB#3 (915) (①).

Then, in this example, because the data is absent in SB#0 (900), the storage blade hop number 525 is incremented by one and then retrieval is continued in SB#2 (910) unless the storage blade hop number 525 reaches the threshold (②).

At the same time, the data (new_data A) is additionally written in the secondary area of SB#0 (900).

As a result, write of secondary data can be completed while primary data is retrieved.

If the data is absent in SB#2 (910), the command/data is simultaneously sent (i.e., broadcast) to remaining storage blades SB#1 (905) and SB#3 (915) to ascertain the presence of the data because the storage blade hop number 525 is not smaller than the hop threshold 586 (③). As a result, because the data is present in SB#3, new_data A is written in the primary area of SB#3 so that old_data A is updated to new_data A.

The broadcast of the command/data is performed by use of either network 610 for data or network 620 for control, especially lower loaded one of the networks 610 and 620.

At the same time, SB#0 (900) broadcasts an instruction to the storage blades SB#1 (905), SB#2 (910) and SB#3 (915) through the network 620 for control to delete the secondary data (old_data A) because the secondary data needs to be deleted from an SB having the secondary data ((④)).

In SB#1 (905) having the secondary data (old_data A), the secondary data is deleted.

Incidentally, the lower half of FIG. 9 shows the relation between processing in each SB and the time required for the processing.

As described above, in the case of double write shown in FIG. 9, write of secondary data can be processed so precedently that the processing time can be shortened compared with the case shown in FIG. 4 and with Embodiment 1 shown in FIG. 6. Hence, because either primary data or secondary data can be actually written in the HDD in an early stage, data can be protected from failure in the processing.

Figure 10:
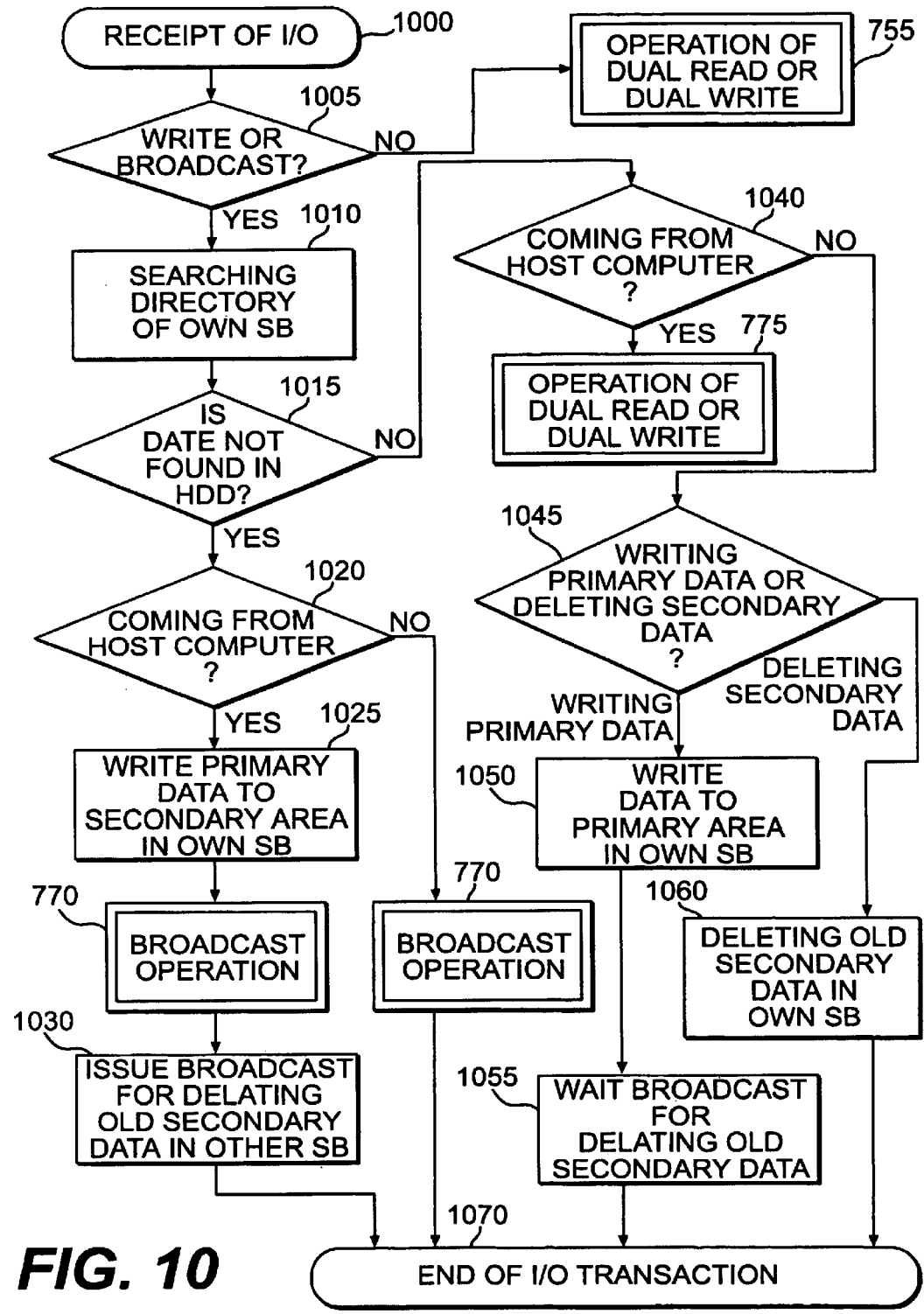
FIG. 10 is a flow chart showing an I/O transaction in Embodiment 2 of the present invention.

FIG. 10 is a flow chart showing an I/O transaction in Embodiment 2 of the present invention.

First, a storage blade (SB) receives I/O (1000).

Then, a judgment is made as to whether either of write and broadcast is required or not (1005).

If another than write and broadcast is required, the operation of dual read or dual write is executed (755). The execution of the operation of dual read or dual write is the same as shown in FIG. 7 and as described above in detail with reference to FIG. 8.

The operation actually executed in this case is however only the operation of dual read.

If either write or broadcast is required, the directory of the own storage blade (SB) is searched with respect to I/O (1010).

Then, a judgment is made as to whether data is found in the HDD or not (1015).

If data is not found in the HDD, a judgment is made as to whether the I/O is I/O coming from the host computer or not (1040).

If the I/O is I/O coming from the host computer, the data is written in the secondary area of the own SB (1025) even in the case where the data is not found in the HDD of the own SB.

Then, a broadcast operation is executed to retrieve the primary data (770). This broadcast operation is the same as the broadcast operation shown in FIG. 7.

Finally, broadcast is issued to each SB to delete old data in the secondary area of another SB (1030). Then, the I/O transaction in the SB receiving I/O is terminated (1070).

If the I/O is not I/O coming from the host computer, the broadcast operation is executed to retrieve the primary data (770) because there is nothing to be done in the own SB. Then, the I/O transaction in the SB receiving I/O is terminated (1070).

Also when data is found in the HDD, a judgment is first made as to whether the I/O is I/O coming from the host computer or not (1040).

If the I/O is I/O coming from the host computer, the operation of dual read or dual write is executed (755) because either primary data or secondary data has been already present in the own SB so that nothing but execution of general dual write is required.

If the I/O is not I/O coming from the host computer, a judgment is made as to whether writing primary data or deleting secondary data is required (1045).

If deleting secondary data is required, the old secondary data in the own SB is deleted (1060) and then the I/O transaction in the SB receiving I/O is terminated (1070).

If writing primary data is required, the data is written in the primary area of the own SB (1050).

Then, notification of broadcast for deleting the old secondary data is received (1055) and finally the I/O transaction in the SB receiving I/O is terminated (1070).

As described above, because the secondary data is written precedently in the SB first receiving I/O, the processing time of double write can be shortened and the data write can be ascertained early.

In another embodiment of the invention, it will be possible to arrange the above data and control network 610 and 620 into a single network to achieve the objects of the invention.

As described above, in accordance with the present invention, because retrieval of primary and secondary data is not made any more when the number of times for retrieval is larger than a threshold, the processing time of dual read/write is shortened so that performance is improved.

In addition, because data is stored precedently in the storage blade first receiving a write instruction, data loss caused by failure in the middle of processing is reduced as well as the processing time is shortened. Hence, both performance and reliability can be improved.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A multiple access storage system comprising:

a plurality of storage blades; and interconnection means for connecting said plurality of storage blades to one another and connecting each of said storage blades to a host system; wherein:

each of said storage blades includes a HDD for storing user data or redundant data of said user data, a controller for controlling said HDD, and an I/O port for input/output of a data frame from/to said interconnection means;

said controller judges, upon reception of a data access request designated by a data frame given from said I/O port, whether data corresponding to said data access request is stored in said HDD or not, and transfers said data frame to another storage blade having a high possibility of presence of the data corresponding to said data access request when the data is absent in the storage blade;

a transmission times region for counting the number of transmission times by which said data frame is transferred between storage blades is provided in said data frame so that a threshold of the number of transmission times is set in each of said storage blades; and if the number of transmission times stored in said transmission times region is not smaller than said threshold of the number of transmission times when a decision is made that the access-requested data is not stored in said HDD, said controller broadcasts said data frame to all storage blades having possibility of presence of the data.

2. A multiple access storage system according to claim 1, wherein a broadcast discrimination region for deciding whether broadcast is performed or not, is provided in said data frame.

3. A multiple access storage system according to claim 1, wherein an ID record region for recording IDs of storage blades through which said data frame has passed is provided in said data frame.

4. A multiple access storage system according to claim 1, wherein said controller increments the number of transmission times in said transmission times region of said data frame by one when said data frame transferred to said storage blade is further transferred to another storage blade.

5. A multiple access storage system according to claim 2, wherein if the number of transmission times stored in said transmission times region is not smaller than said threshold of the number of transmission times when a decision is made that the access-requested data is not stored in said HDD, said controller broadcasts said data frame to all storage blades having possibility of presence of said data and sets a flag in said broadcast discrimination region of said data frame.

6. A multiple access storage system according to claim 3, wherein said controller records ID of said storage blade in said ID record region of said data frame when said data frame transferred to said storage blade is further transferred to another storage blade.

7. A multiple access storage system according to claim 1, wherein an external network is connected to said interconnection means through a load balancer while said host system is connected to said external network.

8. A multiple access storage system according to claim 1, further comprising second interconnection means for connecting said storage blades to one another.

9. A multiple access storage system according to claim 1, wherein said HDD in each of said storage blades has a primary region, and a secondary region.

10. A multiple access storage system according to claim 1, further comprising second interconnection means for connecting said storage blades to one another, wherein:

said HDD in each of said storage blades has a primary region, and a secondary region; and said second interconnection means is used only for notification of an instruction given by a storage blade having a new redundant data stored in said secondary region to delete an old redundant data stored in said secondary region of another storage blade.

11. A multiple access storage system according to claim 1, wherein:

said HDD in each of said storage blades has a primary region, and a secondary region; and said second interconnection means is used only for notification of an instruction given by a storage blade having a new redundant data stored in said secondary region to delete an old redundant data stored in said secondary region of another storage blade.

12. A multiple access storage system according to claim 1, wherein each of said storage blades has a memory for storing said threshold of the number of transmission times so that said threshold of the number of transmission times can be changed in accordance with an external input.

* * * * *